United States Patent [19]

Folomin et al.

[11] 4,147,245

[45] Apr. 3, 1979

[54] HYDRAULICALLY OPERATED FRICTION CLUTCH

[75] Inventors: Anatoly A. Folomin; Vsevolod K. Fesenko; Olgerd I. Girutsky; Vyacheslav N. Paukh, all of Moscow, U.S.S.R.

[73] Assignee: Tsentralny Nauchno-Issledovatelsky Avtomobilny I Avtomotorny Institut (NAMI), Moscow, U.S.S.R.

[21] Appl. No.: 751,200

[22] Filed: Dec. 16, 1976

[51] Int. Cl.² .......................................... F16D 25/06
[52] U.S. Cl. ........................... 192/85 AA; 192/106 F
[58] Field of Search .......... 192/85 AA, 109 F, 106 F, 192/103 F

[56] References Cited

U.S. PATENT DOCUMENTS

| | | | |
|---|---|---|---|
| 2,226,801 | 12/1940 | Black | 192/85 AA |
| 2,670,828 | 3/1954 | McFarland | 192/85 AA |
| 2,795,309 | 6/1957 | Hasbany | 192/106 F |
| 2,876,881 | 3/1959 | Parrett | 192/85 AA |
| 3,190,421 | 6/1965 | Schulz | 192/85 AA |
| 3,482,669 | 12/1969 | Foster-Pegg | 192/85 AA |
| 3,576,241 | 4/1971 | Maurice | 192/85 AA |
| 3,602,347 | 8/1971 | Yamaguchi | 192/85 AA |
| 3,624,769 | 11/1971 | Hansen | 192/85 AA |
| 3,944,036 | 3/1976 | Koshelev | 192/106 F |

Primary Examiner—Henry C. Yuen
Attorney, Agent, or Firm—Fleit & Jacobson

[57] ABSTRACT

A hydraulically operated friction clutch wherein a spring-urged piston is provided to effect engagement of the friction elements, received in a casing mounted on the driving shaft for axial reciprocation relative to this casing and defining with this casing two coaxially arranged variable volume chambers communicating with each other, adapted to receive liquid under pressure the first one of said chambers is in permanent communication with a pressure liquid supply passage, while the other chamber is communicable via a valve means with a drain passage and the pressure liquid supply passage. The pressure liquid supply passage and the drain passage have a portion common to both of them, wherein the valve means is mounted so that the movable valve member thereof can reciprocate in a direction substantially perpendicular to the axis of rotation of the clutch, by which reciprocation it selectively connects the other chamber with the drain passage and with the pressure liquid supply passage. The clutch having the disclosed structure practically precludes slippage and prevents sedimentation of finely dispersed particles on the surface of the other chamber.

4 Claims, 3 Drawing Figures

HYDRAULICALLY OPERATED FRICTION CLUTCH

The present invention relates to vehicle engineering, and, more particularly, it relates to hydraulically operated friction clutches.

There are known hydraulically operated friction clutches comprising friction elements mounted, respectively, on connectable driving and driven shafts and a system for hydraulically operating these elements. This system consists of a casing rigidly fixed on one of the shafts and receiving therein a spring-urged piston adapted to actuate the friction elements. The piston and the casing define therebetween two coaxially arranged chambers of a variable volume, adapted to receive therein liquid under pressure. A throttling passage establishes permanent communication between the chambers. The first chamber, which is the closest to the axis of rotation of the clutch, is in permanent communication with a pressure liquid supply passage communicating, in its turn, with a pressure liquid source. The other chamber is connected to a drain passage via a valve.

In the above specified nitherto known friction clutch, on account of the relatively small flow areas of the passages communicating the first chamber with the other one, there exists a possibility of the clutch beginning slipping, should there appear any leakage, even small, of the pressure liquid past the sealing members of the other chamber. Besides, in operation of the clutch the action of centrifugal forces results in finely dispersed particles (impurities and particles produced by the wearing away of various parts) settling from the pressure liquid, i.e. oil, upon the wall of the other chamber. This pollution of the internal wall of the chamber affects the mobility of the piston and speeds up the wear of the elements of the hydraulic sealing. The above specified known clutch is also characterized by inadequate smoothness of its engagement, caused by the relatively rapid building up of pressure in the other chamber.

It is an object of the present invention to provide a hydraulically operated friction clutch, wherein the supply of pressure liquid to the other chamber should be effected so that the possibility of slippage of the friction elements should be substantially reduced.

It is another object of the present invention to provide a hydraulically operated friction clutch, wherein pollution of the other chamber with finely dispersed solid impurities of the pressure liquid, i.e. of oil should be prevented in operation of the clutch.

It is still another object of the present invention to provide a hydraulically operated friction clutch which should be simpler in manufacture than the hitherto known similar clutches.

It is a further object of the present invention to provide a hydraulically operated friction clutch which should be reliable in operation.

These and other objects are attained in a hydraulically operated friction clutch, wherein the friction elements are operable by a spring-urged piston mounted within a casing secured on the driving shaft, the piston being axially reciprocable relative to this casing and defining therewith two coaxially arranged variable volume chambers communicating with each other and adapted to receive liquid under pressure, the first one of these chambers being in permanent communication with a pressure liquid supply passage and the other chamber being connectable to a drain passage through a valve, in which clutch, in accordance with the present invention, the other chamber is also connectable to the pressure liquid supply passage, for which purpose the latter and the drain passage have a portion common to both of them, in which said valve is arranged so that the movable valve member thereof is reciprocable in a direction substantially perpendicular to the axis of rotation of the clutch, to establish communication of the other chamber selectively with the drain passage and with the pressure liquid supply one.

It is expedient that the casing should have made therein a conduit establishing communication between the other chamber and air space outside this chamber, through a check valve mounted in this conduit.

With the other chamber communicating with ambient air outside the chamber, it becomes possible to create within the second chamber an air cushion which makes engagement of the clutch more smooth.

It is also expedient that the conduit with the check valve should be positioned in the area of the casing, remote from the axis of rotation of the clutch.

The positioning of the conduit in this area of the casing helps to retain air in the other chamber when the pressure liquid is fed thereinto.

A hydraulically operated friction clutch constructed in accordance with the present invention reduces the possibility of slippage of the clutch in operation, enables to engage the friction elements both rapidly and smoothly and would not let finely dispersed solid particles accumulate on the walls of the second chamber. Furthermore, the disclosed clutch is structurally simple, easy to manufacture and reliable in operation.

Given hereinbelow is a description of an embodiment of the invention, with reference being had to the accompanying drawings, wherein.

Figure 1:
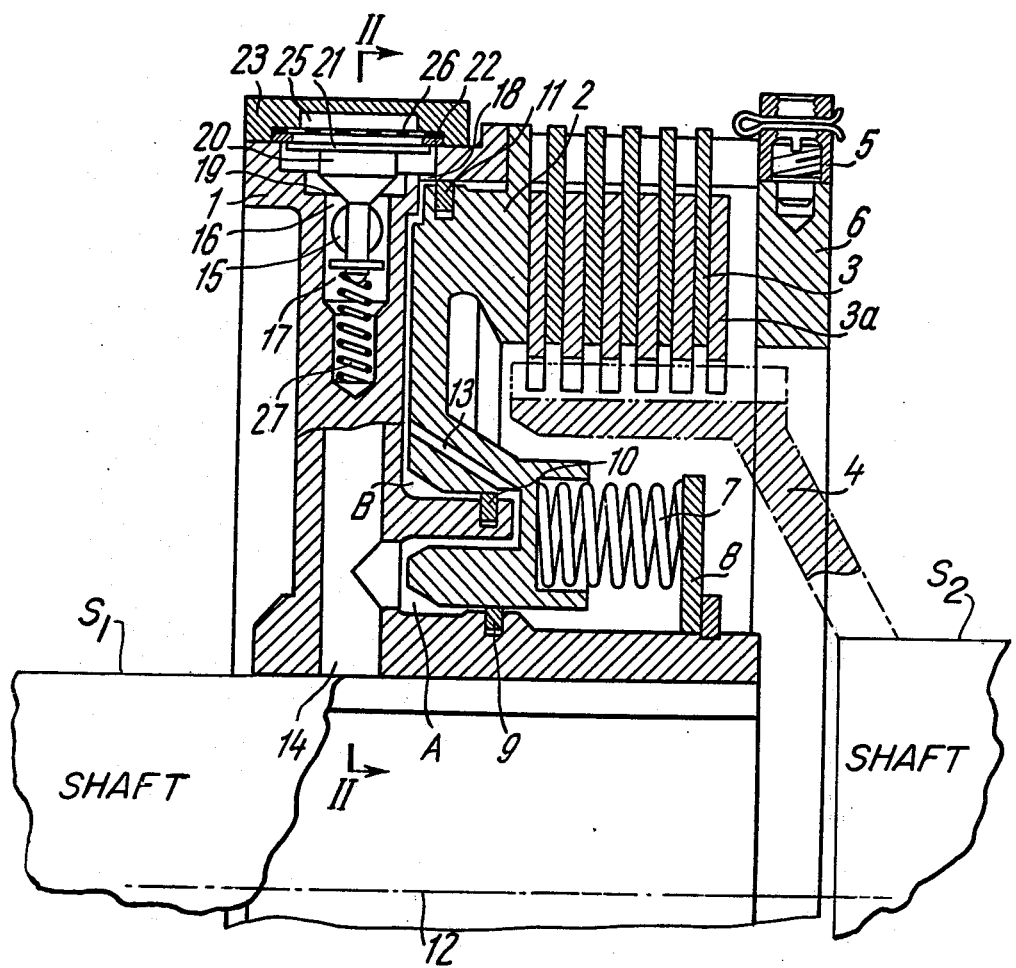
FIG. 1 illustrates a hydraulically operated friction clutch embodying the invention, in a longitudinally sectional view down to the line of symmetry.
Figure 2:
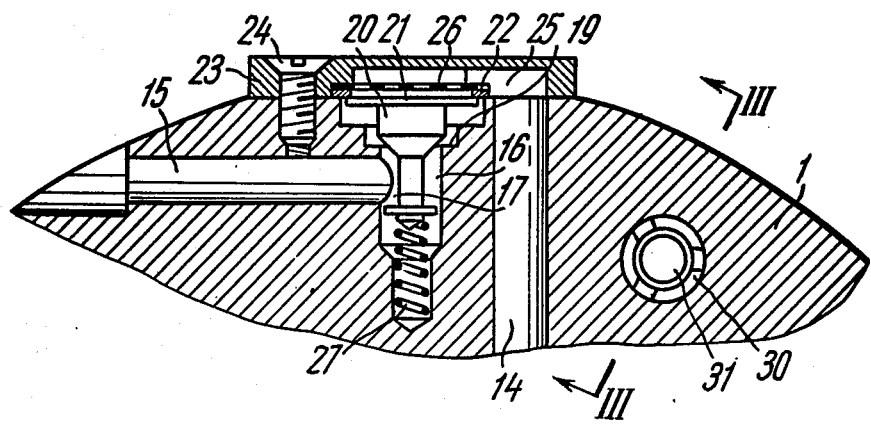
FIG. 2 is a sectional view taken on line II—II of FIG. 1.
Figure 3:
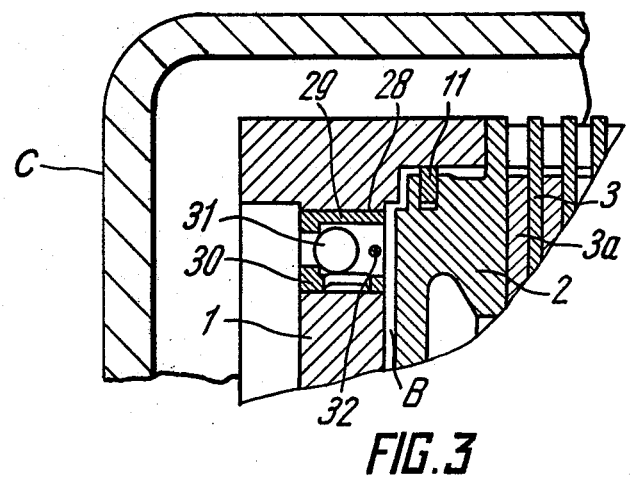
FIG. 3 is a sectional view taken on line III—III of FIG. 2.

Referring now to the drawing, the hydraulically operated friction clutch includes a casing 1 (FIG. 1) secured on a driving shaft $S_1$ and a piston 2 received in the casing 1 and adapted to operate friction elements 3 and 3a. The friction elements 3 are connected with the casing 1 for axial reciprocation relative thereto, while the friction elements 3a are likewise connected for axial reciprocation, with aid of a member 4, to a driven shaft $S_2$. A ring 5 secures to the housing 1 a reaction disc 6. Resilient means are provided to return the piston 2 into the initial position thereof, which resilient means in the presently described embodiment are in the form of cylindrical coiled compression springs 7 uniformly spaced about the clutch. Each spring 7 has one end thereof abutting against the piston 2 and its opposite end abutting against a disc 8 secured to the casing 1. Sealing rings 9, 10 and 11 are provided between the casing 1 and the piston 2. The casing 1 and the piston 2 define there between two coaxially arranged chambers "A" and "B" of variable volume adapted to receive liquid under pressure. The first chamber "A" is of a smaller volume and is arranged closer to the axis 12 of rotation of the clutch. The second chamber "B" of a greater volume is remote from the axis 12 of rotation of the clutch. The chambers "A" and "B" are maintained in permanent communication via a throttling passage 13. The chamber "A" is in permanent communication with a pressure liquid supply passage 14 which, in its turn, communicates with a pressure liquid source and is made so that this pressure liquid supply passage 14 and a drain passage 15 have a portion 16 common to both of them, this portion 16 accommodating a valve assembly 17 adapted to establish selective communication of the chamber "B" with the pressure liquid supply passage 14 and with the drain passage 15. The portion 16 communicates with the chamber "B" through an opening 18 made through the casing 1. The casing 1 has mounted therein a seat 19 engageable by the movable valve member 20 of the valve assembly 17. The movable valve member 20 of the valve assembly 17 is arranged in the portion 16 so that the direction of its reciprocation is substantially perpendicular to the axis 12 of rotation of the clutch. The movable valve member 20 of the valve assembly 17 has a centering portion 21 adapted to center this movable valve member 20, as the latter reciprocates in the direction substantially perpendicular to the axis 12 of rotation of the clutch, i.e. in radial direction, and also to throttle the flow of the liquid supplied into the chamber "B". The portion 21 is adapted to abut against a ring 22 mounted in a lid 23 fixed on the casing 1 with screws 24 (FIG. 2). The lid 23 has made therein a groove 25 (FIGS. 1 and 2) along which the pressure liquid flows from the pressure liquid supply passage 14 to the valve 17. A protection metal gauze 26 is interposed between the ring 22 and the lid 23. The movable valve member 20 of the valve assembly 17 is urged against the ring 22 by a spring 27. The area of the casing 1, the most remote from the axis 12 of rotation of the clutch, has made therein a conduit 28 (FIG. 3) establishing communication between the chamber "B" and ambient air outside this chamber "B", i.e. with the internal space of a case, a portion of which labelled C is illustrated in FIG. 3, accommodating the presently disclosed clutch. The conduit 28 has mounted therein a check valve 29 made up by a housing 30, a ball 31 and a retaining pin 32 preventing falling-out of the ball 31.

The herein disclosed hydraulically operated friction clutch operates, as follows.

When the clutch is being engaged with aid of the hydraulic control system (not shown), liquid under pressure is supplied into the passage 14. This liquid is supplied into the chamber "A" of the clutch and also flows via the groove 25 in the lid 23 and through the protection gauze 26 toward the movable valve member 20 of the valve assembly 17. The pressure of the liquid displaces the valve member 20 radially toward the axis 12 of rotation, until the tapering surface of the valve member 20 engages the annular seat 19. The spring 27 is thereby compressed, and the pressure liquid flows via the annular throttling passage and between the movable valve member 20 of the valve assembly 17 and the adjacent wall of the portion 16 and via the opening 18 into the chamber "B". Since the chamber "A" of the clutch has a relatively small volume, it is rapidly filled with the pressure liquid and provides for rapid displacement of the piston 2. Under the pressure of the liquid in the chamber "A" the piston 2 effects engagement between the elements 3 and 3a with a small effort. The chamber "B" becomes filled with the liquid considerably slower than the chamber "A". As the piston 2 is rapidly displaced toward the friction elements 3 and 3a, suction is created within the chamber "B". Owing to this suction, air is drawn into the chamber "B" past the check valve 29, to be gradually compressed therein by the pressure of the liquid flowing in. As more liquid flows into the chamber "B", the pressure therein is gradually built up and finally closes the check valve 29. Owing to this gradual build up of pressure within the chamber "B", the effort of pressing together the friction elements 3 and 3a is likewise gradually increased which enhances smooth engagement of the clutch. As the pressure within the chamber "B" rises, the rate of the inflow of the liquid into this chamber diminishes, which additionally enhances the smoothness of the buildup of the torque transmitted by the clutch.

To disengage the clutch, the passage 14 is connected to drain by the hydraulic control system (not shown). As a result, the gauge pressure in the passage 14, as far as the portion of this pressure which is dependent on the operation of the pump of the hydraulic control system (not shown) is concerned, drops to zero. Consequently, the movable valve member 20 of the valve assembly 17 is radially driven away from the axis 12 of rotation of the clutch, i.e. lifted off its seat, to open the access to the drain passage 15. The liquid flows from the chamber "B" via the opening 18 and the drain passage 15. The liquid from the supply passage 14 and from the chamber "A" likewise flows out through the drain passage 15, some volume of the liquid flowing from the chamber "A" into the chamber "B" through the passage 13, to flow out of the chamber "B" via the opening 18 and the drain passage 15. The rapid withdrawal of the liquid from the chambers "A" and "B" of the clutch enables the springs 7 to return the piston 2 rapidly into the initial position of the piston 2, i.e. to effect rapid disengagement of the clutch.

The rapid withdrawal of the liquid from the chambers "A" and "B" is accompanied by pronounced swirling of that portion of the liquid which has not yet been able to leave these chambers. As a result of this swirling motion, finely dispersed particles settling on the internal surfaces of the chambers "A" and "B" by the centrifugal action are mixed with the liquid and are carried away from the chambers together with the liquid. In this way positive cleaning of the internal surfaces of the chambers "A" and "B" is effected.

In the herein disclosed friction clutch, owing to the lesser degree of throttling of the flow of the liquid supplied into the chamber "B", any leakage of the pressure liquid from the chamber past the seals affects to a considerably smaller degree the ability of the clutch to prevent slippage.

What is claimed is:

1. A hydraulically operated friction clutch rotatable about an axis comprising: a casing; friction elements accommodated within said casing; a spring-urged piston adapted to effect engagement of said friction elements, likewise accommodated within said housing; two variable volume chambers defined between said casing and said piston, arranged coaxially and permanently communicating with each other; said two variable volume chambers being adapted to receive therein liquid under pressure, controlling the engagement of said friction elements; pressure liquid supply passage means made in said casing for supplying pressure liquid; a drain passage made in said casing; a first one of said two variable volume chambers permanently communicating with said pressure liquid supply passage means; common passage means for connecting the second one of said two variable volume chambers with said pressure liquid supply passage means and with said drain passage; a valve means for selectively connecting said second variable volume chamber with said pressure liquid supply means and said drain passage, said valve means selectively connecting said common passage means with one of said pressure liquid supply means and said drain passage; said valve means having a movable valve member mounted for reciprocation in a direction substantially perpendicular to the axis of rotation of said friction clutch.

2. A hydraulically operated friction clutch as set forth in claim 1, wherein said casing has formed therein a conduit adapted to establish communication between said second one of said two variable volume chambers and the air space outside and said friction clutch includes a check valve mounted in said conduit.

3. A hydraulically operated friction clutch as set forth in claim 2, wherein the conduit with the check valve mounted therein is positioned in the area of said casing, the most remote from the axis of rotation of said clutch.

4. A hydraulically operated friction clutch as set forth in claim 1, wherein portions of said two variable volume chambers are concentric and the first one of said two variable volume chambers is positioned within said casing closer to the chamber axis then the second one of said two variable volume chambers.

* * * * *